United States Patent
Gopalan

(10) Patent No.: US 11,388,561 B2
(45) Date of Patent: *Jul. 12, 2022

(54) PROVIDING A SUMMARY OF MEDIA CONTENT TO A COMMUNICATION DEVICE

(71) Applicant: AT&T Intellectual Property I, L.P., Atlanta, GA (US)

(72) Inventor: Raghuraman Gopalan, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 112 days.

This patent is subject to a terminal disclaimer.

(21) Appl. No.: 17/024,312

(22) Filed: Sep. 17, 2020

(65) Prior Publication Data
US 2021/0006948 A1  Jan. 7, 2021

Related U.S. Application Data

(63) Continuation of application No. 16/209,235, filed on Dec. 4, 2018, now Pat. No. 10,812,948, which is a (Continued)

(51) Int. Cl.
  *H04W 4/18*  (2009.01)
  *H04L 65/60*  (2022.01)
  *H04L 67/306*  (2022.01)

(52) U.S. Cl.
  CPC ............. *H04W 4/18* (2013.01); *H04L 65/602* (2013.01); *H04L 67/306* (2013.01); *H04L 65/60* (2013.01)

(58) Field of Classification Search
  CPC ..... H04L 67/306; H04L 65/602; H04L 65/60; H04W 4/00; H04W 4/12; H04W 4/18
  (Continued)

(56) References Cited

U.S. PATENT DOCUMENTS 5,758,257 A   5/1998  Herz
5,956,716 A   9/1999  Kenner
(Continued)

FOREIGN PATENT DOCUMENTS

CN          102223416 A   * 10/2011

OTHER PUBLICATIONS

Chang, et al., "Extract Highlights From Baseball Game Video With Hidden Markov Models", Proceedings. International Conference on Image Processing, vol. 1, IEEE, 2002, pp. I-609-I-602.
(Continued)

*Primary Examiner* — Rownak Islam
(74) *Attorney, Agent, or Firm* — Guntin & Gust, PLC; Matthew Tropper

(57) ABSTRACT

A wireless communication device includes a processor, a display device coupled to the processor, and a memory accessible to the processor. The memory includes instructions executable by the processor to perform operations. The operations include receiving a user input to play a media content item. The operations include sending a request for a summary of the media content item to a network device in response to the user input in lieu of sending a particular request for the media content item. The operations also include, in response to the reply including media content, sending the media content to the display device for display.

20 Claims, 5 Drawing Sheets

Related U.S. Application Data continuation of application No. 14/805,702, filed on Jul. 22, 2015, now Pat. No. 10,158,983.

(58) Field of Classification Search
USPC .......................................................... 370/329
See application file for complete search history.

(56) References Cited

U.S. PATENT DOCUMENTS

| | | |
|---|---|---|
| 6,236,395 B1 | 5/2001 | Sezan et al. |
| 6,363,380 B1 | 3/2002 | Dimitrova |
| 6,986,154 B1 | 1/2006 | Price |
| 7,035,435 B2 | 4/2006 | Li et al. |
| 7,738,778 B2 | 6/2010 | Agnihotri et al. |
| 8,060,906 B2 | 11/2011 | Begeja et al. |
| 8,345,990 B2 | 1/2013 | Chaudhuri et al. |
| 8,386,935 B2 | 2/2013 | Van et al. |
| 8,621,521 B2 | 12/2013 | Mccoskey et al. |
| 8,695,031 B2 | 4/2014 | Steinberg et al. |
| 8,745,665 B2 | 6/2014 | Roberts et al. |
| 2002/0042921 A1 | 4/2002 | Ellis |
| 2002/0054089 A1 | 5/2002 | Nicholas et al. |
| 2003/0163816 A1 | 8/2003 | Gutta et al. |
| 2004/0117831 A1 | 6/2004 | Ellis et al. |
| 2007/0255755 A1 | 11/2007 | Zhang et al. |
| 2008/0016533 A1 | 1/2008 | Rothschild |
| 2008/0304807 A1 | 12/2008 | Johnson et al. |
| 2009/0238538 A1 | 9/2009 | Fink |
| 2010/0251295 A1 | 9/2010 | Amento et al. |
| 2010/0251305 A1 | 9/2010 | Kimble et al. |
| 2010/0287589 A1 | 11/2010 | Stiers |
| 2011/0078325 A1* | 3/2011 | Vanover .................. H04L 63/10 726/26 |
| 2012/0130971 A1 | 5/2012 | Morris |
| 2012/0324491 A1 | 12/2012 | Bathiche et al. |
| 2014/0099081 A1 | 4/2014 | Cudak et al. |
| 2014/0325568 A1 | 10/2014 | Hoang et al. |
| 2014/0366066 A1 | 12/2014 | Ramakrishnan et al. |
| 2015/0066897 A1 | 3/2015 | Vronay et al. |
| 2015/0070516 A1 | 3/2015 | Shoemake et al. |
| 2015/0229975 A1 | 8/2015 | Shaw et al. |
| 2016/0006785 A1 | 1/2016 | Zhang et al. |
| 2016/0150288 A1 | 5/2016 | Wilson |
| 2016/0299968 A1 | 10/2016 | Song et al. |
| 2019/0110171 A1 | 4/2019 | Gopalan |

OTHER PUBLICATIONS

Dimitrova, et al., "Applications of Video-Content Analysis and Retrieval", IEEE Multimedia, vol. 9, Issue 3, Jul. 2002, pp. 42-55.

Ekin, et al., "Automatic Soccer Video Analysis and Summarization", IEEE Transactions on Image Processing, vol. 12, Issue 7, Jul. 2003, pp. 796-807.

Girgensohn, et al., "Keyframe-Based User Interfaces for Digital Video", Computer, vol. 34, Issue 9, Sep. 2001, pp. 61-67.

Graham, et al., "A Paper-Based Interface for Video Browsing and Retrieval", Proceedings. International Conference on Multimedia and Expo, vol. 2 IEEE, 2003, pp. LL-749-752.

He,"Auto-Summarization of Audio-Video Presentations", Proceedings of the Seventh ACM International Conference on Multimedia (Part 1), ACM, 1999, pp. 489-498.

Ngo, et al., "Video Summarization and Scene Detection by Graph Modeling", IEEE Transactions on Circuits and Systems for Video Technology, vol. 15, Issue 2, Feb. 2005, pp. 296-305.

Otsuka, et al., "A Highlight Scene Detection and Video Summarization System Using Audio Feature for a Personal Video Recorder", International Conference on Consumer Electronics. 2005 Digest of Technical Papers, pp. 223-224.

Shahraray, et al., "Pictorial transcripts: Multimedia processing applied to digital library creation", First Workshop on Multimedia Signal Processing, IEEE, 1997, 6 pages.

Tjondronegoro, et al., "Extensible Detection and Indexing of Highlight Events in Broadcast Sports Video", Proceedings of the 29th Australasian Computer Science Conference, vol. 48, Australian Comp. Soc. Inc., 2006, pp. 237-246.

* cited by examiner

PROVIDING A SUMMARY OF MEDIA CONTENT TO A COMMUNICATION DEVICE

CROSS REFERENCE TO RELATED APPLICATION(S)

This application is a continuation of U.S. patent application Ser. No. 16/209,235 filed on Dec. 4, 2018, which is a continuation of U.S. patent application Ser. No. 14/805,702 (now U.S. Pat. No. 10,158,983) filed on Jul. 22, 2015. All sections of the aforementioned application(s) and/or patent(s) are incorporated herein by reference in their entirety.

FIELD OF THE DISCLOSURE

The present disclosure is generally related to providing a summary of media content to a communication device.

BACKGROUND

A summary of a media content item may enable a viewer to determine in a short amount of time whether the viewer wants to watch the media content item. A summary of the media content item may be a textual summary, a trailer associated with the media content item (e.g., a movie trailer), an advertisement associated with the media content item, a preview associated with the media content item, a review of the media content item, other media content that may enable a viewer to determine whether to watch the media content item, or combinations thereof. Many media content items available via the internet from web sites and video service providers do not have an associated summary. For example, videos made by user devices and posted via social networking sites typically are not associated with pre-stored summaries.

DETAILED DESCRIPTION

Figure 1:
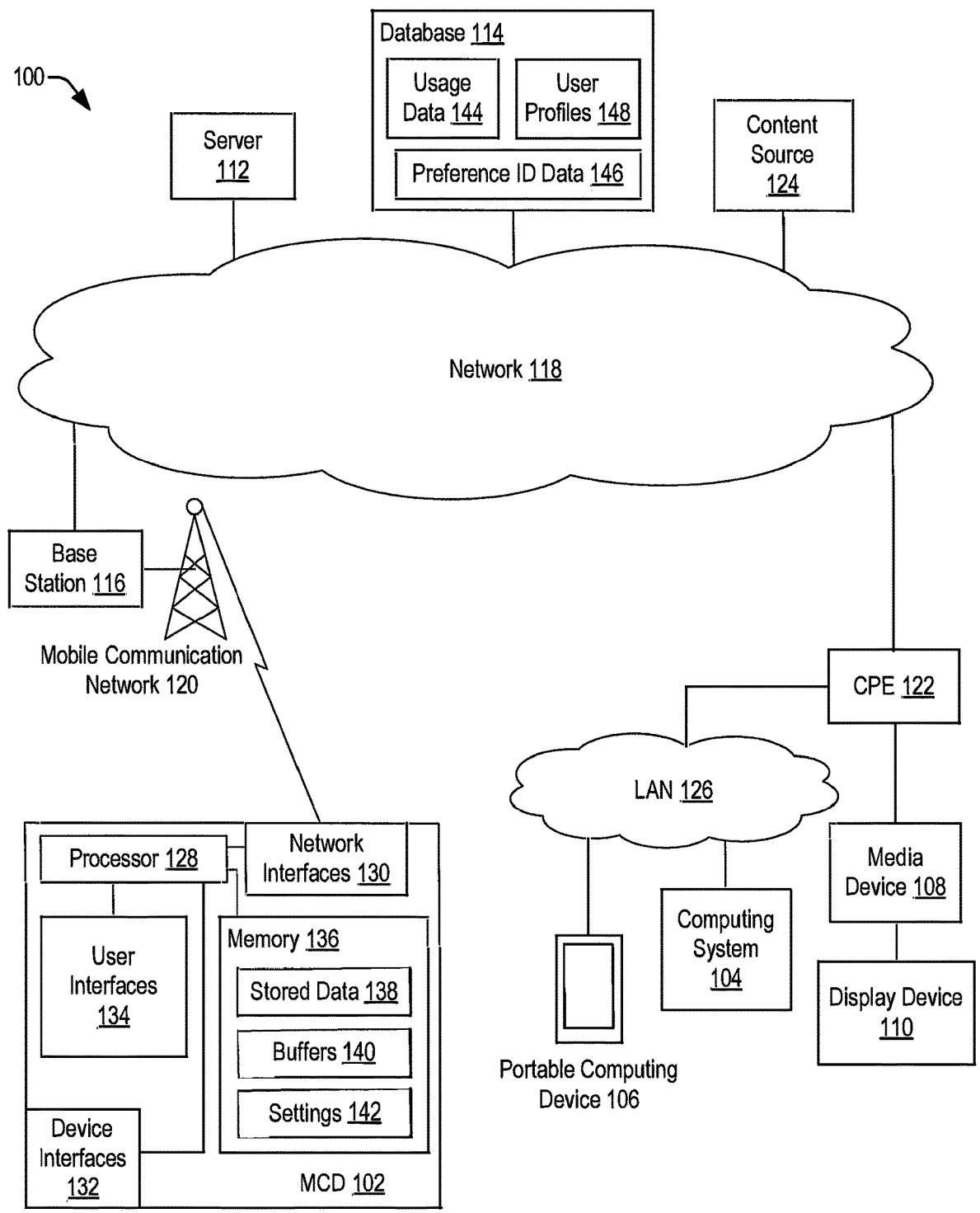
FIG. 1 is a block diagram of a media content distribution system that enables delivery of a summary of a media content item to a user device.

A service provider associated with a user device may enable the user device to retrieve a summary of a media content item, regardless of whether the media content item has a previously stored summary associated with the media content item. When the media content item is not associated with a pre-stored summary, a network device associated with the service provider may analyze the media content item based on a user profile associated with the user device and provide selected portions of the media content item to the user device that are deemed to be of interest based on the user profile as a dynamically generated summary Providing selected portions of the media content item may enable a user of the user device to quickly determine whether to watch the entire media content item, thereby increasing user satisfaction with the service provider. Providing a dynamically generated summary may result in bandwidth savings for the service provider since the user may decide to not request the entire media content item corresponding to the dynamically generated summary.

In an illustrative embodiment, a method includes receiving, at a network device, a request from a device for a summary of a media content item. The method includes accessing the media content item in response to the request. The method includes performing an analysis of the media content item based on a user profile associated with the device. The user profile indicates preferences and the analysis determines whether the media content item includes a feature indicated by any of the preferences. The method also includes, in response to the analysis indicating that the media content item includes the feature, selecting representative frames of the media content item based on the analysis and sending the representative frames to the device.

In an illustrative embodiment, a computer-readable storage device includes instructions executable by a processor to perform operations. The operations include accessing a media content item in response to a request from a device for a summary of the media content item. The operations include determining whether to send representative frames based on the media content item. The operations include, in response to determining to send the representative frames, performing an analysis of the media content item based on a user profile associated with the device, where the user profile indicates preferences. The analysis determines whether the media content item includes a feature indicated by any of the preferences. The operations also include, in response to determining to send the representative frames and in response to the analysis indicating that the media content item includes the feature, selecting the representative frames of the media content item based on the analysis and sending the representative frames to the device.

In an illustrative embodiment, a wireless communication device includes a processor and a memory accessible to the processor. The memory includes instructions executable by the processor to perform operations. The operations include receiving user input to play a media content item. The operations include sending a request for a summary of the media content item to a network device in response to the user input. The operations include receiving a reply to the response. The operations also include, in response to the reply including media content, sending the media content to a display device for display.

FIG. 1 is a block diagram that illustrates a particular embodiment of a system 100 that enables a service provider to deliver a summary of a media content item to a user device (e.g., one of user devices 102-110). The summary may correspond to or include a pre-stored summary of the media content item (e.g., a trailer) or may correspond to or include a dynamically generated summary of the media content item. A dynamically generated summary may be provided when the media content item is not associated with a pre-stored summary or when a setting of the user device does not enable presentation of the pre-stored summary. The dynamically generated summary may be based on a user profile associated with the user device so that the dynamically generated summary includes content of interest to one or more people associated with the user profile.

The service provider may provide data service (e.g., internet access), telephone service, television service, other services, or combinations thereof, to subscribers via one or more network devices. The network devices may include, for example, servers 112, databases 114, wireless network base stations 116, routers, digital subscriber line multiplexers, cable modem termination systems, other type of network devices, or combinations thereof.

The user devices 102-110 may be associated with a subscriber account of the service provider. The user devices 102-110 may include devices capable of communication via a network 118 (e.g., the internet, a private network, or both), a mobile communication network 120, or both. The user devices 102-110 may include, but are not limited to, one or more mobile communication devices 102 (e.g., a mobile phone), one or more computing systems 104, one or more portable computing devices 106 (e.g., a laptop computer, a tablet computer, computerized glasses, a personal digital assistant, etc.), one or more media devices 108 and one or more coupled output devices (e.g., one or more sound systems, one or more display devices 110, one or more haptic devices, or combinations thereof). The media device 108 may include a set-top box device, a game system, or another device that is configured to send media content to an output device coupled to the media device 108 and that is configured to communicate via the network 118. The media device 108 may be an integral component of the display device 110 or may be a separate component. Types of user devices and a number of user devices associated with a particular subscriber account may be different than the user devices 102-110 depicted in FIG. 1.

One or more of the user devices 102-110 may receive media content from the network 118 via customer premises equipment (CPE) 122. The media content may be received from a content source 124 that stores the media content. The CPE 122 may facilitate communications between the network 118 and each media device 108 coupled to the CPE 122. The CPE 122 may also facilitate communications to and from the network 118 and one or more user devices (e.g., user devices 102-106) coupled by a wireless connection or a wired connection to a local area network (LAN) 126 established by, or accessible to, the CPE 122. The CPE 122 may be an access point to the network 118. The CPE 122 may include a router, a wireless router, a local area network device, a modem (e.g., a digital subscriber line modem or a cable modem), a residential gateway, another communication device, or combinations thereof.

A user device of the user devices 102-110 (e.g., the mobile communication device 102 or the portable computing device 106) may receive media content via the mobile communication network 120 and the network 118. The user device may utilize the mobile communication network 120 when the user device is not in communication with the network 118 via the CPE 122 or another network access point.

Each of the user devices 102-110 may include a processor and a memory accessible to the processor. A processor may execute instructions stored in an associated memory to perform operations. The operations may include, but are not limited to, sending a request for a summary of a media content item to a network device, receiving media content in response to the request, and processing and outputting the media content to one or more output devices associated with the user device (e.g., a display device, a sound system, a haptic device, other output device, or combinations thereof).

As an example, the mobile communication device (MCD) 102 may include a processor 128. The processor 128 may be coupled to network interfaces 130, device interfaces 132, user interfaces 134, and a memory 136. The network interfaces 130 may enable the MCD 102 to communicate with other devices via an access point (e.g., the CPE 122) or a base station of a wireless wide area network (e.g., the base station 116 of the mobile communication network 120). The device interfaces 132 may enable external devices or power sources to be coupled to the MCD 102. The user interfaces 134 may enable a user to input data to the MCD 102 and may enable the user to receive output from the MCD 102. The user interfaces 134 may include, but are not limited to, a display device, a touch screen, one or more indicators, a keyboard, one or more buttons, one or more switches, a microphone, one or more speakers, a camera, a vibration mechanism, other devices, or combinations thereof.

The memory 136 may include stored data 138, buffers 140, and settings 142. The stored data 138 may include the instructions executable by the processor 128, media content items, applications, other data, or combinations thereof. The buffers 140 may include temporary storage locations for incoming data received via the network interfaces 130, the device interfaces 132, or the user interfaces 134. The buffers 140 may also include temporary storage locations for outgoing data to be sent via the network interfaces 130, the device interfaces 132, or the user interfaces 134. The settings 142 may include information used during operation of the MCD 102. The settings 142 may include values for various options associated with the MCD 102 (e.g., a value that specifies whether summary media content should be retrieved, a value that specifies a time length of a dynamically generated summary, etc.). The values may include default values, user defined values, or both. Some or all of the values may be accessed and changed via the network interfaces 130, via one or more of the device interfaces 132, via one or more of the user interfaces 134, or via combinations thereof.

A user of the MCD 102 may request media content from the content source 124. The user may request the media content by interacting with one or more of the user interfaces 134. When the user requests the media content, the MCD 102 may access a processing setting of the settings 142 to determine how to process the request. When the processing setting is a first value, the MCD 102 may send a request for the media content to the content source 124, retrieve the media content, and output the media content. When the processing setting is a second value, the MCD 102 may send a summary request for a summary of the media content to the server 112, may receive a reply from the server 112, and may output particular content based on the reply.

When the processing setting is a third value, the MCD 102 may send a query via one or more of the user interfaces 134 to determine whether to provide a summary of the media content or to retrieve the media content from the content source 124. The query may include a first selectable option to retrieve the media content, a second selectable option to retrieve a summary of the media content, and a third selectable option to cancel the request for the media content.

When the user selects the first selectable option, the MCD 102 may send a request for the media content to the content source 124, retrieve the media content, and output the media content. When the user selects the second selectable option, the MCD 102 may send a summary request to the server 112, receive a response from the server 112, and output the response. When the user selects the third selectable option, or when the user does not respond to the query in a threshold amount of time, the MCD 102 may not request the media content or the summary.

The value of the processing setting may be set by the user or may be a default value. The value of the processing setting may be dependent on a type of network connection used by the MCD 102. For example, when the MCD 102 is connected to the network 118 by an access point (e.g., the CPE 122), the value for the processing setting may be the first value or the third value. When the MCD 102 is connected to the network 118 by the base station 116 of the mobile communication network 120, the value for the processing setting may the second value.

When the MCD 102 sends the summary request to the server 112, the server 112 sends a reply to the MCD 102. The reply may include particular media content that is presented as output to the user of the MCD 102 via one or more of the user interfaces 134. The particular media content may be the media content, a pre-stored summary of the media content, a dynamically generated summary of the media content based on a user profile associated with the MCD 102, or a dynamically generated summary produced by sampling portions of the media content. When the particular media content is not the media content, the MCD 102 may send a query to one or more of the user interfaces 134 to determine whether the user wishes to retrieve the media content after being presented with the particular media content.

The MCD 102 may be one of the user devices 102-110. The user devices 102-110 may be associated with the subscriber account of the service provider. The user devices 102-110 may communicate with the server 112 associated with the service provider. The server 112 may receive data about service usage from the user devices 102-110, process the data to generate processed data, and store the processed data as usage data 144 associated with an identifier of the subscriber account in the database 114. The usage data 144 may include viewing history of media content (e.g., television programming, pay-per-view programming, video on demand programming) including media content that was requested and displayed and some of the media content that was available but not requested (e.g., the user watched a soccer game for a particular span of time instead of golf, football, and basketball, which were also available during the span of time and the usage data may include that soccer was selected and golf, football, and basketball were not selected, which may be used to indicate a preference among sports), data corresponding to time spent watching particular media content, explicit data regarding likes and dislikes in viewed media content (e.g., data indicated by pressing a particular button on a remote control device or one of the user devices 102-110 to indicate that the user likes the media content being viewed), network usage patterns (e.g., web page viewing history), user input (e.g., responses to questions regarding likes and dislikes), purchase history via the network 118, other network usage, or combinations thereof.

The server 112 may analyze the usage data 144 associated with the user devices 102-110 based on the subscriber account, user device identifiers, or combinations thereof. The server 112 may determine preferences for the one or more users associated with the user devices 102-110 to generate or update one or more user profiles associated with the subscriber account, the user devices 102-110, or combinations thereof. The preferences may indicate people, events, subjects, other categories, or combinations thereof, that are of interest to the one or more users. The preferences may also indicate people, events, subjects, other categories, or combinations thereof, that are not of interest to the one or more users (i.e., things the one or more users prefer not to see).

When the usage data 144 indicates a preference, the server 112 may access the database 114 and retrieve particular preference identification data that corresponds to the preference from preference identification data 146 in the database 114. The particular preference identification data may enable a network device to identify whether particular media content includes one or more features that indicate that content corresponding to the preference is likely to be in the particular media content. The preference identification data 146 in the database 114 may be populated with data used to identify media content that includes particular categories that are of interest to many subscribers of the service provider (e.g., underwater images, baseball games, football games, soccer games, particular types of animals, famous people, etc.), or combinations thereof. When the preference identification data 146 does not include particular preference identification data for the preference, the server 112 may generate the particular preference identification data. For example, the preference may indicate a preference for media content that includes a person associated with the subscriber account that is not a famous person. The server 112 may access one or more photographs, videos, or other media content that includes the person, determine facial recognition data for the person, and use the facial recognition data as the particular preference identification data.

Preference identification data for a particular preference may include lighting characteristics, object characteristics, facial recognition characteristics, information to identify particular language or noises in audio of the media content indicative of the preference, other characteristics, or combinations thereof, that indicate presence of the particular preference in media content. The particular preference identification data may identify spatial features, spatio-temporal features, audio features, or combinations thereof, of the particular preference.

For each preference identified by the server 112 from the usage data 144 for the subscriber account, the server 112 may include the preference and the particular preference identification data usable to identify the preferences in media content in one or more user profiles associated with the user devices 102-110. The one or more user profiles may be stored in association with the identifier of the subscriber account, with an identifier of a particular user device of the user devices 102-110, or both. The one or more user profiles may be stored with other user profiles 148 in the database 114.

In a particular embodiment, the user of a particular user device of the user devices 102-110 may search for media content to retrieve from the network 118. The user may search a program guide, may perform a search using a search engine, may use a search engine of a video service, may search a listing of recommended content provided by the service provider, another entity, friends, family, or other people, or the user may find media content to retrieve in some other way.

The user of the particular user device may select particular media content available from the content source 124. The particular user device may check processing settings associated with the particular user device to determine what to do in response to selection of the particular media content. When the processing settings indicate to send a summary request, the particular user device may send the summary request to the server 112. The summary request may identify the particular media content, may identify whether the summary can be a pre-stored summary based on a summary setting of the particular device, may include the subscriber account identifier, may include other information, or combinations thereof.

The server 112, in response to receipt of the summary request, may retrieve the particular media content from the content source. Based on one or more characteristics of the particular media content (e.g., length of the particular media content, whether the particular media content is video content that can be summarized by representative frames of the video content, etc.), one or more searches for a pre-stored summary, or combinations thereof, the server 112 may determine whether to send representative frames of the particular media content to the particular device in response to the summary request. When the server 112 determines not to send representative frames of the particular media content to the particular media device, the server 112 may determine what response to send to the particular media device. The response may be the particular media content item, a pre-stored summary, a listing of pre-stored summaries, or other content. The server 112 may send the response to the particular user device.

When the server 112 determines to send representative frames of the particular media content to the particular media device, the server 112 may retrieve a user profile associated with the particular media device from the user profiles 148 of the database 114. The server 112 may analyze the particular media content based on the user profile to determine whether the particular media content includes one or more of the preferences indicated in the user profile. The server 112 may analyze the particular media content in a number of ways to generate features of the particular media content. An analysis of the particular media content may determine spatial features (e.g., scale invariant feature transforms (SIFT), histograms of oriented gradients, speed up robust features, local binary patterns, Gabor wavelets, etc.), spatio-temporal features (e.g., optical flow motion histogram, SIFT tracks, histograms of temporal gradients, etc.), audio features, other features, or combinations thereof. The analysis may compare features determined from the particular media content with preference identification information from the user profile that corresponds to the preferences to determine whether one or more of the preferences are included in the particular media content.

When the analysis indicates that the particular media content includes one or more preferences indicated in the user profile, the server 112 may select representative frames of the particular media content. The analysis may identify frames of the particular media content that are distinct as well as spanning information contained in the particular media content. Identifying the frames may be formulated as a sparse representation task that utilizes discriminative and generic functions. In a particular example, harnessing sparsity in data may utilize optimization techniques based on an 1.sub.1 norm. A solver may optimally find representations that maximize a ratio of diversity to repeatability in deciding upon a subset of frames that are the representative frames. The subset of frames may include first frames that include preferences indicated in the user profile that are of interest based on the user profile and second frames that include preferences indicated in the user profile that are not of interest. Identifying the frames may also include determining a size of a dynamically generated summary to be sent as a response to the request. The size may be a first size when the dynamically generated summary is to be delivered via the mobile communication network 120 and may be a second size when the dynamically generated summary is not delivered via the mobile communication network 120. The first size or the second size may be reduced based on congestion in the network 118, the mobile communication network 120, or both. Determining the size of the dynamically generated summary and the frames of the particular media content to be included in the dynamically generated summary may be formulated as a joint sparse representation task. Joint sparsity techniques to perform the join sparse representation task may address scenarios where there is a sparse common component with innovations, common sparse supports, and a non-sparse common component with sparse innovations. Optimization techniques for determining the frames for the joint sparse representation task may be based on stochastic bipartite graphs.

The analysis may prioritize the first frames based on particular frames corresponding to multiple preferences, based on characteristics associated with the frames (e.g., lighting characteristics and auditory characteristics), other considerations, or combinations thereof. Prioritization may enable selection of particular frames that correspond to preferences and exclusion of other frames that correspond to preferences when the size determined for the dynamically generated summary does not allow inclusion of all first frames corresponding to preferences from the user profile.

The dynamically generated summary of the media content may be generated based on the first frames and the second frames. The server 112 may attempt to include content of interest and exclude content not of interest so that a viewer of the dynamically generated summary may be satisfied with viewing the dynamically generated summary. The dynamically generated summary may be smaller than the size determined for the dynamically generated summary when the dynamically generated summary based on the first frames is smaller than the size. Alternately, the dynamically generated summary may also include portions of the particular media content in addition to the first frames when the size of the dynamically generated summary allows the additional frames to be included. The portions may be located near the first frames, may be selected based on visual characteristics, audio characteristics, or both; may be selected based on other considerations; or combinations thereof. The frames included in the dynamically generated summary may be representative frames. The dynamically generated summary may include audio portions corresponding to the representative frames. The server 112 may send the dynamically generated summary to the particular user device.

When the analysis indicates that the particular media content does not include one or more preferences indicated in the user profile, the server 112 may select representative frames as a particular number of frame blocks from the particular media content. The frame blocks may be uniformly distributed in time in the particular media content. The server 112 may generate a dynamically generated summary from the frame blocks. The dynamically generated summary may include audio corresponding to the frame blocks. The number and the size of the frame blocks may be determined based on congestion in the network that is used to send the dynamically generated summary to the particular user device. The server 112 may send the representative frames to the particular user device.

In an illustrative example, a user of the MCD 102 may use the MCD 102 to access, from a particular web site, a video of a soccer game recorded for a team, where a child of the user is a member of the team. The video may have a two hour play time. A user profile, from the user profiles 148 in the database 114, associated with the MCD 102, a service provider account associated with the user, or both, may indicate that the user has a preference for the child (e.g., indicated by explicit input stating a preference for the videos that include the child) and a preference for goals (e.g., indicated by usage data for the MCD 102 or other devices associated with the service provider account in the usage data 144 that shows that goals are often replayed one or more times). Based on settings of the MCD 102 and in response to the user using the MCD 102 to access the video, the MCD 102 may send a request for a summary of the video to the server 112.

The server 112 may determine to provide a dynamically generated summary to the MCD 102. The server 112 may retrieve the video and retrieve the user profile associated with the MCD 102. The server 112 may analyze the video and determine that the video includes portions that show the child and portions that show goals. The server 112 may determine, based on network congestion associated with providing content to the MCD 102, that a playtime of the summary is to be 7 minutes. The server 112 may generate a dynamically generated summary that includes at least portions of the video that include the child (e.g., based on facial recognition data, body recognition data, or both) and portions of the video that show goals (e.g., based on an increase in crowd noise, detection of the words "goal", "score", or both, in audio of the video, based on video analysis that indicates a ball going into a goal, or combinations thereof) and that does not exceed the playtime. The server 112 may send the dynamically generated summary to the MCD 102. After playing the dynamically generated summary, the MCD 102 may send a query to the user to determine if the user wants to see all of the video. The user may be satisfied with seeing the dynamically generated summary that is personalized for the user with portions of the video that are of interest to the user (e.g., the child and goals) and may not request the entire video (thereby saving network bandwidth).

Thus, the system of FIG. 1 enables a user device of the plurality of user devices 102-110 associated with the service provider to send a summary request for a summary of media content to the server 112. When the server 112 determines to generate a dynamically generated summary in response to the summary request, the server 112 may generate the dynamically generated summary based on preferences indicated in a user profile associated with the user device so that the dynamically generated summary is personalized. The dynamically generated summary based on the user profile may include content of interest to the user and may satisfy the user so that the user does not request to view the media content corresponding to the summary after viewing the summary.

Figure 2:
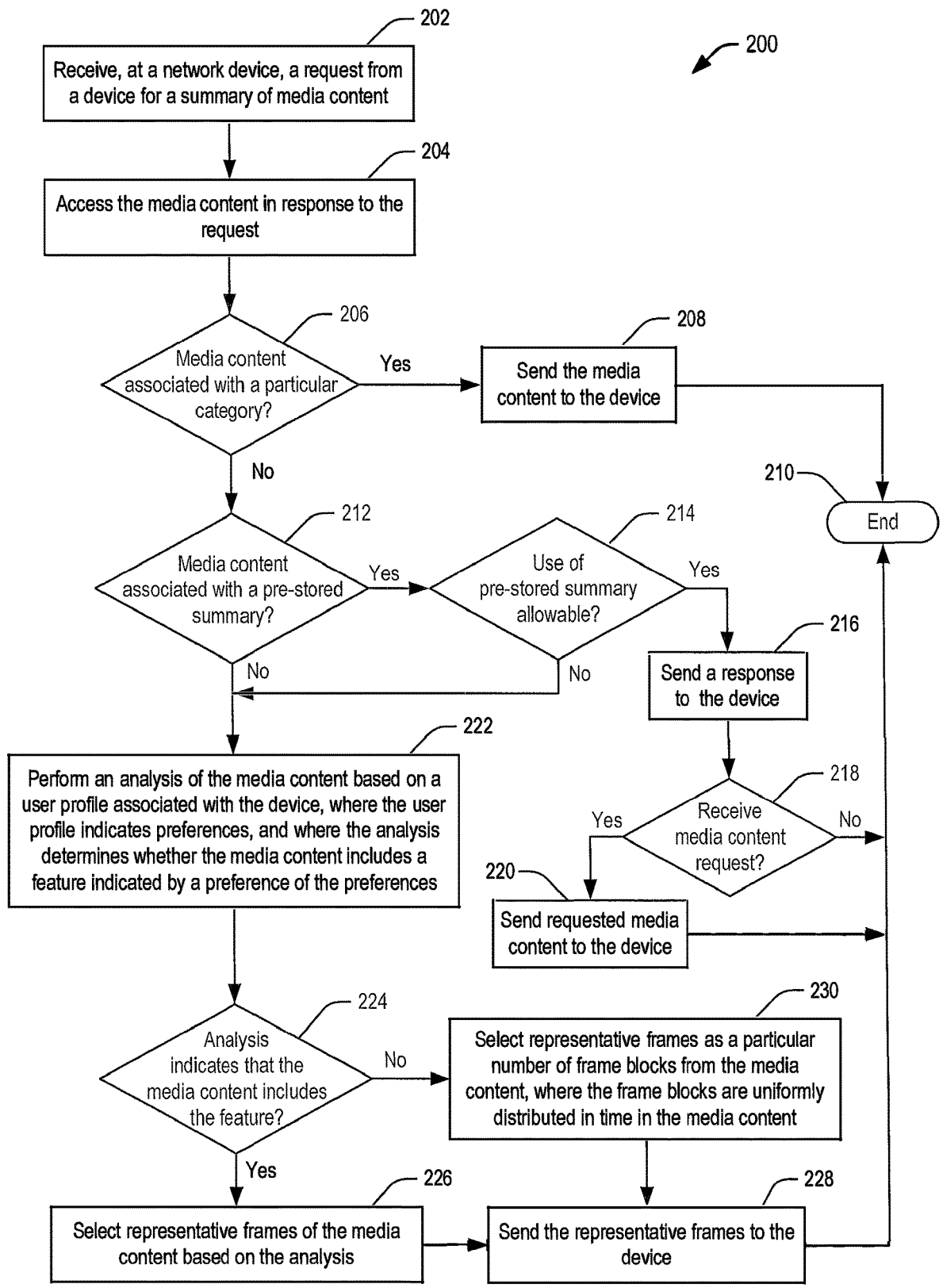
FIG. 2 is a flowchart of a first embodiment of a method to provide a summary of media content to a communication device.

FIG. 2 depicts a flowchart of a first embodiment of a method 200 of providing a summary of media content to a communication device. The method 200 may be performed by a network device (e.g., the server 112 of FIG. 1). The method 200 may include receiving, at the network device, a request from a device for a summary of a media content item, at 202. The network device may access the media content item in response to the request, at 204.

The network device may determine whether the media content is associated with a particular category of a plurality of categories, at 206. The plurality of categories may include music videos, how-to videos, short media content (e.g., media content that has a play time of less than two minutes or other threshold time or a file size that is less than a threshold size), other types of media content not conducive to being summarized, or combinations thereof. In a particular embodiment, the determination is based on metadata associated with the media content, a size of a file storing the media content, or both. When a determination indicates that the media content is associated with the particular category, the network device may send the media content to the device as a response, at 208. The response may include information that indicates that the response is the media content. The method 200 may end at 210.

When the media content is not associated with one of the plurality of categories, at 206, the network device may determine whether the media content is associated with a pre-stored summary, at 212. The pre-stored summary may be a trailer associated with the media content (e.g., a movie trailer), an advertisement associated with the media content, a preview associated with the media content, a review of the media content, other media content that may enable a viewer to determine whether to watch the media content, or combinations thereof. Information indicating whether a pre-stored summary is associated with the media content may be obtained from metadata associated with the media content, from searching one or more databases that include information associated with summaries for media content, by performing a search using one or more search engines, by other searches, or by combinations thereof.

When the media content is associated with a pre-stored summary, the network device may determine whether use of a pre-stored summary is allowable, at 214. A determination may be based on information included in the request (e.g., a flag value in the request indicating that a pre-stored summary is allowable), or the response may send a query to the device for a setting associated with allowing the use of a pre-stored summary. When the determination indicates that the use of a pre-stored summary is allowable, the network device may send a response to the device, at 216. The response may be a listing of titles associated with pre-stored summaries. In response to the listing, the network device may receive a media content request corresponding to an item in the listing, corresponding to a request for a dynamically generated summary generated by the network device, or corresponding to the media content. When the network device receives the media content request, at 218, the network device may send a response including requested media content to the device, at 220. When the requested media content is the media content, the response may include information that indicates that the response includes the media content. The method 200 may then end, at 210. When the network device does not receive a media content request, at 218, the method 200 may then end, at 210.

When the media content is not associated with a pre-stored summary, at 212, or when the use of a pre-stored summary is not allowable, at 214, the network device may perform an analysis of the media content based on a user profile associated with the device, at 222. The user profile may indicate preferences of one or more users associated with the user profile. The analysis may determine whether the media content includes at least one feature indicated by a preference of the preferences. The user profile may be received with the request, may be requested from the device by the network device, may be requested from a service provider associated with the device by the network device, or combinations thereof.

One or more servers of the service provider may generate the user profile. The one or more servers may access usage data associated with one or more devices (e.g., mobile communication devices, set-top box devices or other media devices, computer systems, tablet computers, laptop computers, portable communication devices, other types of devices, or combinations thereof) associated with a user or group of users. The usage data may include viewing history of media content (e.g., television programming, pay-per-view programming, video on demand programming), network usage patterns, user input (e.g., responses to questions regarding likes and dislikes), purchase history via the network, other network usage, or combinations thereof.

The one or more servers may identify preferences associated with the one or more devices based on the usage data. The preferences may include people, events, subjects, other categories, or combinations thereof, that are of interest to one or more users associated with the one or more devices. The preferences may also include people, events, subjects, other categories, or combinations thereof, that are not of interest to one or more users associated with the one or more user devices.

When the usage data indicates a preference, the one or more servers may include identification data in the user profile that is useful for determining whether particular media content includes one or more of the preferences. The identification data may include lighting characteristics, object characteristics, facial recognition characteristics, information to identify particular language or noises in audio of the media content indicative of preferences, other characteristics, or combinations thereof, previously determined to indicate presence of a preference in media content. The identification data may identify spatial features, spatio-temporal features, audio features, or combinations thereof, of the preferences. The identification data may be generated by the one or more servers (e.g., from one or more images of persons of interest), may be obtained from a database that is populated with data used to identify media content that includes particular categories that are of interest to many subscribers of the service provider (e.g., underwater images, baseball games, football games, soccer games, particular types of animals, famous people, etc.), or combinations thereof.

When the network device obtains the user profile, the network device may analyze the media content in a number of ways to generate features of the video. An analysis of the media content may determine spatial features, spatio-temporal features, audio features, other features, or combinations thereof. The analysis may compare features determined from the media content with the identification data corresponding to preferences identified in the user profile to determine whether one or more of the preferences are included in the media content.

When the analysis indicates that the media content includes one or more preferences indicated in the user profile, at 224, the network device may select representative frames of the media content, at 226. The analysis may identify frames of the media content that are distinct as well as spanning information contained in the media content. Identifying the frames may be formulated as a sparse representation task that utilizes discriminative and generic functions. Identified frames may include first frames that include preferences indicated in the user profile that are of interest based on the user profile and second frames that include preferences indicated in the user profile that are not of interest. Identifying the frames may also include determining a size of a dynamically generated summary to be sent as a response to the request. The size determination may be determined based on congestion in a network (e.g., a wireless wide area network) used to send the dynamically generated summary to the device. Determining the size of the dynamically generated summary and the frames of the media content to be included in the dynamically generated summary may be formulated as a joint sparse representation task.

The dynamically generated summary of the media content may be generated based on the first and second frames. The network device may attempt to include content of interest and to exclude content not of interest so that a viewer of the dynamically generated summary may be satisfied with viewing the summary and not request the media content. The dynamically generated summary may include the representative frames. The dynamically generated summary may include audio portions corresponding to the representative frames. The network device may send the representative frames to the device, at 228. The representative frames may be sent as a portion of the dynamically generated summary. The method 200 may end at 210.

When the analysis indicates that the media content does not include one or more preferences indicated in the user profile, at 224, the network device may select representative frames as a particular number of frame blocks from the media content, at 230. The frame blocks may be uniformly distributed in time in the media content. A dynamically generated summary of the media content may include the representative frames. The dynamically generated summary may include audio corresponding to the frame blocks. The number and the size of the frame blocks may be determined based on congestion in the network that is used to send the dynamically generated summary to the device. The network device may send the representative frames to the device, at 228. The representative frames may be sent as a portion of the dynamically generated summary The method 200 may end at 210.

Thus, the method 200 of FIG. 2 enables delivery of a reply to a summary request for a summary of media content received from a communication device. The reply may include particular media content. The particular media content may be the media content, a pre-stored summary, or a dynamically generated summary. The dynamically generated summary may be based on a user profile associated with the communication device. The dynamically generated summary may reflect preferences indicated in the user profile. The dynamically generated summary may satisfy a viewer of the dynamically generated summary so that the viewer does not subsequently request the media content corresponding to the dynamically generated summary.

Figure 3:
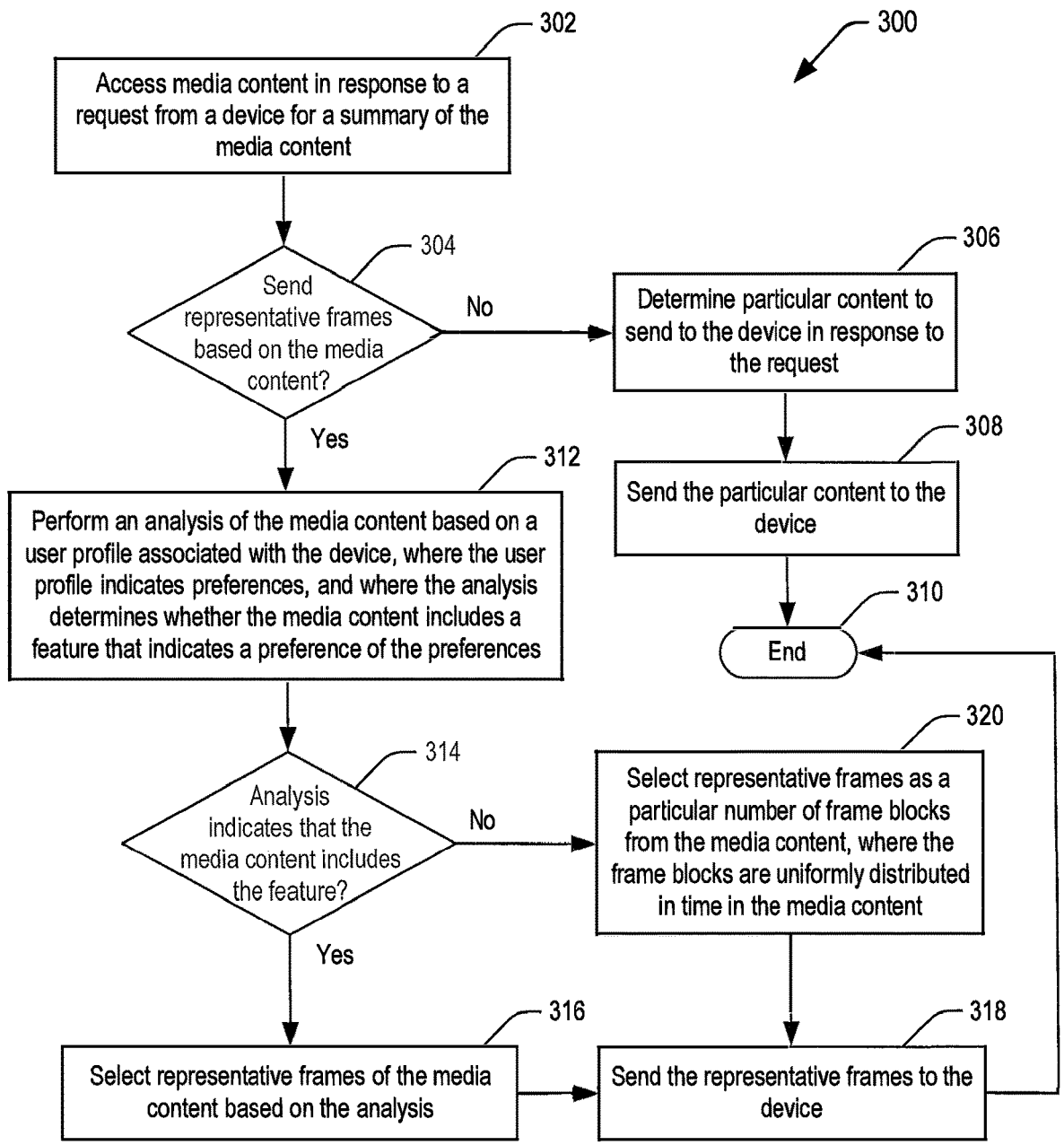
FIG. 3 is a flowchart of a second embodiment of a method to provide a summary of media content to a communication device.

FIG. 3 depicts a flowchart of a second embodiment of a method 300 of providing a summary of media content to a communication device. The method 300 may be performed by a processor of a network device (e.g., a processor of the server 112 of FIG. 1). The method 300 may include accessing media in response to a request from a device for a summary of the media content, at 302.

Based on the media content, a determination may be made of whether to send representative frames of the media content to the device based on the media content in response to the request. The determination may be based on a size of the media content, a type of the media content, whether the media content is associated with at least one pre-stored summary, other factors, or combinations thereof. When the determination is not to send representative frames of the media content, at 304, the processor may determine particular content to send to the device in response to the request, at 306. The particular content may be the media content, a pre-stored summary, a listing of titles of pre-stored summaries, other content, or combinations thereof. The processor may send the particular content to the device, at 308. The method 300 may end, at 310.

When the determination is to send representative frames of the media content based on the media content, at 304, the processor may perform an analysis of the media content based on a user profile associated with the device, at 312. The user profile may indicate preferences associated with one or more users of the device and identification data for determining whether the media content includes one or more of the preferences. The analysis may determine whether the media content includes a feature that indicates a preference of the preferences.

The processor may analyze the media content in a number of ways to generate features of the video. An analysis of the media content may determine spatial features (e.g., scale invariant feature transforms (SIFT), histograms of oriented gradients, speed up robust features, local binary patterns, Gabor wavelets, etc.), spatio-temporal features (e.g., optical flow motion histogram, SIFT tracks, histograms of temporal gradients, etc.), other features, or combinations thereof. The analysis may compare features determined from the media content with the identification data in the user profile that corresponds to preferences to determine whether one or more of the preferences are included in the media content.

When the analysis indicates that the media content includes at least one preference, at 314, the processor may select representative frames of the media content, at 316. The analysis may identify frames of the media content that are distinct as well as spanning information contained in the media content. Identifying the frames may be formulated as a sparse representation task that utilizes discriminative and generic functions. Identified frames may include first frames that include preferences indicated in the user profile that are of interest based on the user profile and second frames that include preferences indicated in the user profile that are not of interest. Identifying the frames may also include determining a size of a dynamically generated summary to be sent as a response to the request. The size determination may be determined based on congestion in a network used to send the dynamically generated summary to the device. Determining the size of the dynamically generated summary and the frames of the media content to be included in the dynamically generated summary may be formulated as a joint sparse representation task.

The dynamically generated summary of the media content may be generated based on the first and second frames. The processor may attempt to include content of interest and exclude content not of interest so that a viewer of the dynamically generated summary may be satisfied with viewing the dynamically generated summary and not request the media content. The dynamically generated summary may include the representative frames. The dynamically generated summary may include audio portions corresponding to the representative frames. The network device may send the representative frames to the device, at 318. The representative frames may be sent as a portion of the dynamically generated summary. The method 300 may end at 310.

When the analysis indicates that the media content does not include a feature that indicates a preference of the preferences in the user profile, the processor may select representative frames as a particular number of frame blocks from the media content, at 320. The frame blocks may be uniformly distributed in time in the media content. A dynamically generated summary of the media content may include the representative frames. The dynamically generated summary may include audio corresponding to the frame blocks. The number of frame blocks and the size of the frame blocks may be determined based on congestion in the network that is used to send the dynamically generated summary to the device. The network device may send the representative frames to the device, at 318. The representative frames may be sent as a portion of the dynamically generated summary. The method 300 may end at 310.

Thus, the method 300 of FIG. 3 enables delivery of a reply to a summary request for a summary of media content received from a communication device. The reply may include particular media content. The particular media content may be the media content, a pre-stored summary, or a dynamically generated summary. The dynamically generated summary may be based on a user profile associated with the communication device. The dynamically generated summary may reflect preferences indicated in the user profile. The dynamically generated summary may satisfy a viewer of the generated media content so that the viewer does not subsequently request the media content corresponding to the dynamically generated summary.

Figure 4:
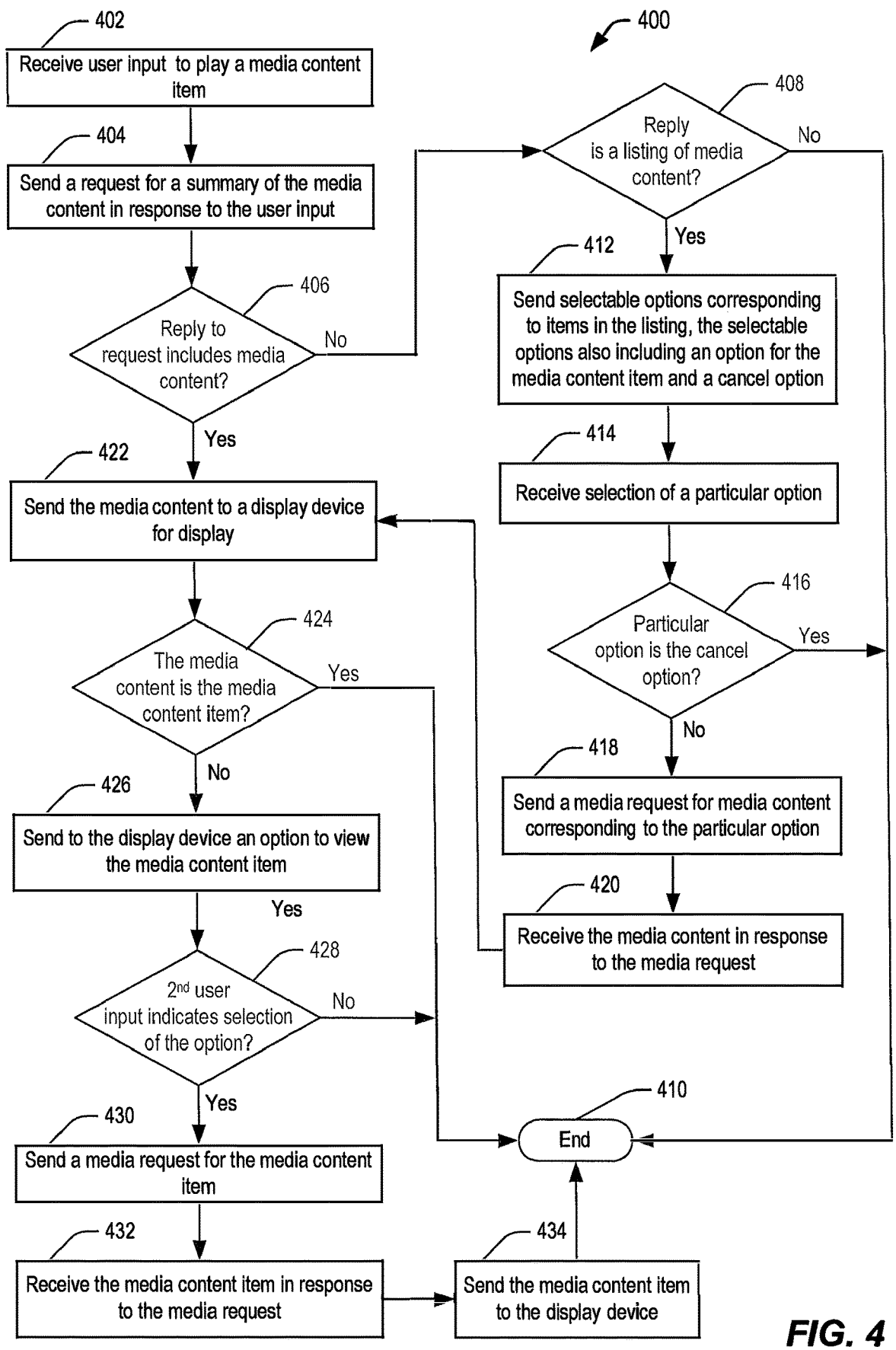
FIG. 4 is a flowchart of a third embodiment of a method to provide a summary of media content to a communication device.

FIG. 4 depicts a flowchart of a third embodiment of a method 400 of providing a summary of media content to a communication device. The method 400 may be performed by the communication device (e.g., one of the user devices 102-110 of FIG. 1). The method 400 may include receiving user input to play a media content item, at 402.

The communication device may send a request for a summary of the media content to a network device in response to the user input, at 404. The request may include information (e.g., a flag) that indicates whether a response to the request can include at least one pre-stored summary (e.g., previews, trailers, reviews, etc.). A particular value for the flag may indicate that the response cannot include a pre-stored summary. A user of the communication device may change the default value to a different value to enable the summary to be a pre-stored summary. The different value may allow the response to include selected types of pre-stored summaries or all types of pre-stored summaries. The value of the flag may be changed by changing a setting of the communication device.

The communication device may receive a reply to the request. The reply may include a second flag that indicates whether the reply is the media content item. The communication device may determine whether the reply includes media content, at 406. When the reply does not include media content, at 406, the communication device may determine whether the reply is a listing of media content, at 408. When the reply is not the listing, an error may have occurred and the method 400 may end, at 410. When the reply is the listing, at 408, the communication device may send selectable options corresponding to items in the listing to a display device, at 412. The selectable options may also include an option to retrieve the media content item, an option to retrieve a dynamically generated summary, other options, a cancel option, or combinations thereof.

The communication device may receive user input of selection of a particular option, at 414, or the cancel option may be inferred after passage of a threshold amount of time (e.g., 30 seconds, 45 seconds, 1 minute, or some amount of time). When the particular option is the cancel option, at 416, or when the cancel option is inferred, the method 400 may end, at 410.

When the particular option is not the cancel option, the communication device may send a media request for media content corresponding to the particular option to the network device or another network device, at 418. When the particular option is the option to retrieve the media content item, the second flag may be set to indicate that the media content is the media content item. The communication device may receive the media content in response to the media request, at 420. The communication device may send the media content to the display device, at 422. Concurrently, or in the alternative, the communication device may send the media content to one or more output devices (e.g., to an audio system, a haptic output device, another type of output device, or combinations thereof).

In addition to sending the media content item to the display device when the communication device receives the media content item in reply to the media request, the communication device may send media content to the display device, at 422, when the reply to the request for the summary of the media content includes media content, at 406. The communication device may determine whether the media content sent to the display device is the media content item, at 424. For example, when a value of the second flag is a particular value, the media content is the media content item. When a determination is that the media content is the media content item, the method 400 may end, at 410.

When the determination is that the media content is not the media content item, at 424, the communication device may send to the display device an option to view the media content, at 426. The communication device may also send a second option not to retrieve the media content item. When second user input indicates that the second option is selected, at 428, or after passage of the threshold amount of time, the method 400 may end, at 410. When the second user input indicates selection of the option to view the media content item, at 428, the communication device may send a media request for the media content item, at 430. The communication device may receive the media content item in response to the media request, at 432. The communication device may send the media content item to the display device, at 434. The method 400 may end, at 410.

Thus, the method of FIG. 4 enables a communication device that received user input requesting a media content item to receive a summary of the media content item. The user device may send a summary request to a network device. In response to the summary request, the media device may receive media content and output the media content to a user of the communication device. The media content may be the media content item or a summary of the media content item. When the communication device determines that the media content is not the media content item, the communication device may present an option to retrieve the media content item.

Various embodiments disclosed herein describe providing a user device with a summary of media content. The summary may be generated by a network device based on a user profile so that the summary reflects preferences of one or more people associated with the user device. Generating the summary may allow for a summary of media content that is not associated with an existing summary. Generating the summary may enable the summary to have a size that is appropriate for network conditions (e.g., selected based on congestion associated with one or more networks that are to be used to send the summary to the user device). Generating the summary allows the summary to be personalized based on preferences indicated in a user profile associated with a user device, a user account, or both. The summary may be personalized by tailoring the summary to include content corresponding to content indicated by preferences in the user profile and to exclude content corresponding to unwanted content indicated by preferences (or negative feedback) in the user profile. Tailoring the summary to the preferences may enable the summary to satisfy a viewer of the summary so that the viewer does not request the media content corresponding to the summary after viewing the summary. Providing summaries of media content that satisfy viewers may result in significant bandwidth savings and cost savings to one or more service providers that provide the summaries.

Figure 5:
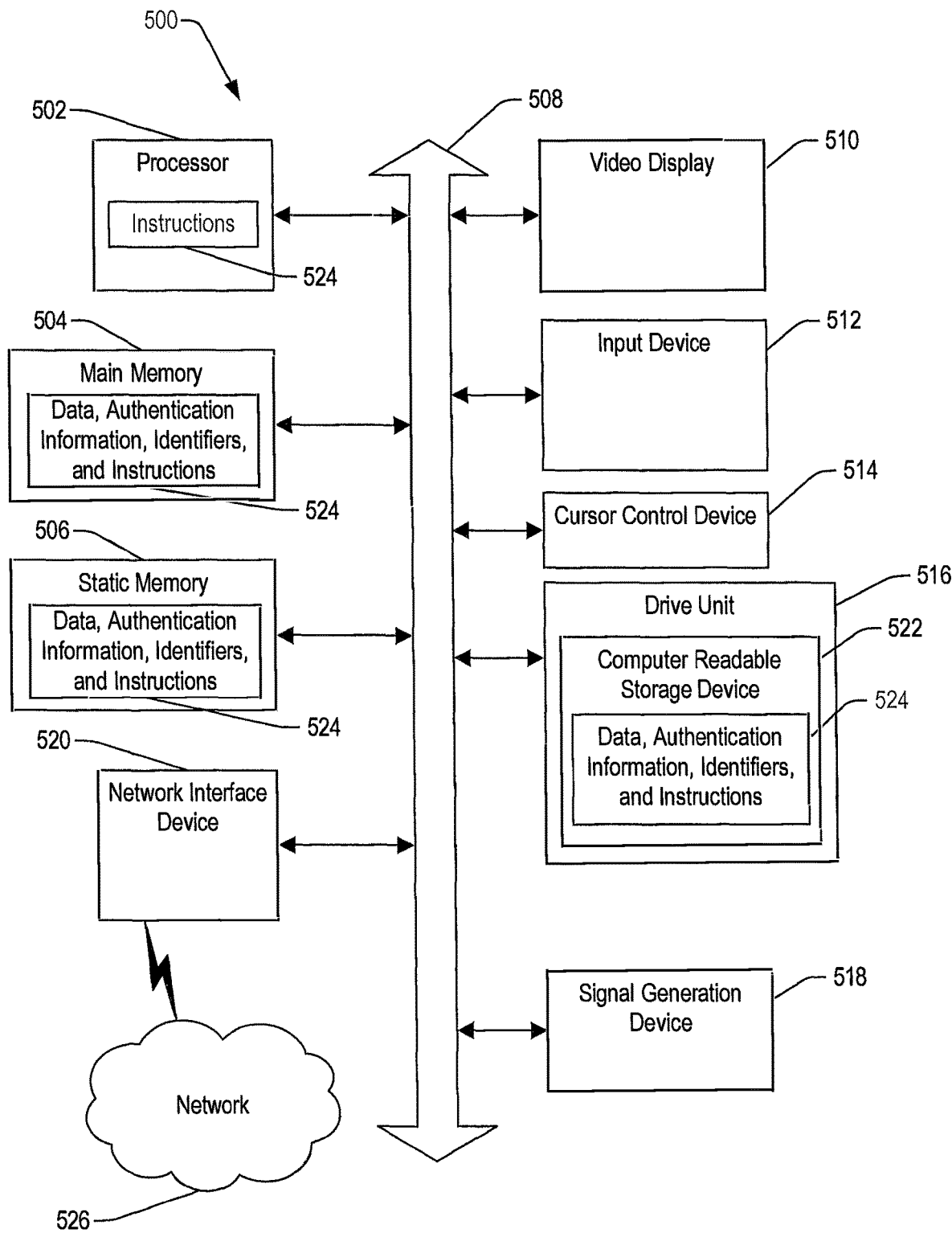
FIG. 5 is a block diagram of an illustrative embodiment of a general computer system.

Referring to FIG. 5, an illustrative embodiment of a general computer system is shown and is designated 500. The computer system 500 includes a set of instructions (e.g., the instructions 524 in the memory 504) that can be executed to cause the computer system 500 to perform any one or more of the methods or computer based functions disclosed herein. The computer system 500 may operate as a stand-alone device or may be connected (e.g., using a network) to other computer systems or peripheral devices. For example, the computer system 500 may include or may be included within any one or more of the user devices 102-110, the server 112, the database 114, the base station 116, the content source 124, or combinations thereof described with reference to FIG. 1.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a server, a network device, a mobile device, a palmtop computer, a laptop computer, a desktop computer, a communications device, a wireless telephone, a personal computer (PC), a tablet PC, a personal digital assistant (PDA), a set-top box (STB) device, a media playback device, a customer premises equipment device, an endpoint device, a web appliance, or any other machine capable of executing a set of instructions (sequential or otherwise) that specify actions to be taken by that machine. In a particular embodiment, the computer system 500 may be implemented using electronic devices that provide video, audio, data communication, or combinations thereof. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502 (e.g., a central processing unit (CPU), a graphics processing unit (GPU), or both). Moreover, the computer system 500 may include a main memory 504 and a static memory 506, which can communicate with each other via a bus 508. As shown, the computer system 500 may further include a video display unit 510, such as a liquid crystal display (LCD), a light emitting diode (LED) display, a touch screen display, a flat panel display, a solid state display, or a lamp assembly of a projection system. Additionally, the computer system 500 may include an input device 512, such as a remote control device (e.g., a television remote or a set-top box remote), a keyboard, a joystick, another type of input device, or combinations thereof. In addition, the computer system 500 may include a cursor control device 514 (e.g., a mouse). In some embodiments, the input device 512 and the cursor control device 514 may be integrated into a single device, such as a capacitive touch screen input device. The computer system 500 may also include a drive unit 516, a signal generation device 518, such as a speaker or remote control, and a network interface device 520. Some computer systems 500 may not include an input device (e.g., a server may not include an input device).

In a particular embodiment, as depicted in FIG. 5, the drive unit 516 may include a computer-readable storage device 522 in which authentication information, identifiers, and one or more sets of instructions 524 (e.g. software) can be embedded. The computer-readable storage device 522 may be random access memory (RAM), read-only memory (ROM), programmable read-only memory (PROM), erasable PROM (EPROM), electrically erasable PROM (EEPROM), one or more registers, solid-state memory, one or more hard disks, one or more removable disks, compact disc read-only memory (CD-ROM), other optical disk storage, magnetic disk storage, magnetic storage devices, or any other storage device usable to store program code in the form of instructions or data and that can be accessed by a computer and/or a processor. A computer-readable storage device is not a signal.

Further, the instructions 524 may embody one or more of the methods or logic as described herein. The instructions 524 may be executable by the processor 502 to perform one or more functions or methods described herein, such as the methods 200, 300, and 400 described with reference to FIGS. 2-4, respectively. In a particular embodiment, data (e.g., information corresponding to media content), authentication information, identifiers, and instructions 524 may reside completely, or at least partially, within the main memory 504, the static memory 506, and/or within the processor 502 during execution by the computer system 500. The main memory 504 and the processor 502 also may include a computer-readable storage device. The authentication information included in the authentication information, identifiers, and instructions 524 in the drive unit 516, the main memory 504, the static memory 506, the processor 502, or combinations thereof may be transmitted to another computer system to enable authentication of the computer system 500, and the identifiers may include a list of identifiers used to authenticate the other computer system, prior to sharing a resource with the other computer system.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality described herein. It is further noted that a computing device, such as a processor, a controller, a state machine or other suitable device for executing instructions to perform operations may perform such operations directly or indirectly by way of one or more intermediate devices directed by the computing device.

The computer system 500 may communicate with one or more external systems via a network 526. First data stored by the computer-readable storage device 522 may be sent to the one or more external systems via the network 526. Also, second data may be received by the computer system 500 via the network 526. The second data may be stored by the processor 524 to the computer-readable storage device. Additionally, while the computer-readable storage device 522 is shown to be a single device, the computer-readable storage device 522 may be a single device or may be multiple devices, such as a centralized or distributed database, and/or associated caches and servers that store one or more sets of instructions. The computer-readable storage device 522 is capable of storing a set of instructions for execution by the processor 502 to cause the computer system 500 to perform any one or more of the methods or operations disclosed herein.

In a particular non-limiting, exemplary embodiment, the computer-readable storage device 522 may include a solid-state memory such as embedded memory (or a memory card or other package that houses one or more non-volatile read-only memories). Further, the computer-readable storage device 522 may include a random access memory or other volatile re-writable memory. Additionally, the computer-readable storage device 522 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for short-range communications and long-range communications can be used by the computer system 500 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A wireless communication device comprising:
a processor;
a display device coupled to the processor; and
a memory accessible to the processor, the memory comprising instructions executable by the processor to perform operations, the operations comprising:
determining whether a summary of a media content item is to be obtained, the media content item having been requested for play by first user input, the determining being based upon a type of network connection utilized by the wireless communication device, the determining resulting in a determination;
in response to the first user input and in a case of the determination being that the summary of the media content item is to be obtained, sending a request for the summary of the media content item to a network device in lieu of sending a particular request for the media content item; and
in response to a reply to the request comprising media content, sending the media content to the display device for display.

2. The wireless communication device of claim 1, wherein the media content comprises a subset of frames of a plurality of frames of the media content item.

3. The wireless communication device of claim 2, wherein the subset of frames is based on a user profile associated with the wireless communication device.

4. The wireless communication device of claim 1, wherein the media content comprises selected representative frames as a particular number of frame blocks of the media content item.

5. The wireless communication device of claim 4, wherein the frame blocks are uniformly distributed in time in the media content item.

6. The wireless communication device of claim 1, wherein the operations further comprise, after display of the media content and in response to the reply comprising a subset of frames of the media content item, sending to the display device an option to view the media content item.

7. The wireless communication device of claim 6, wherein the operations further comprise, responsive to second user input indicating a selection of the option:
sending a media request for the media content item to a content source;
receiving the media content item responsive to the media request; and
sending the media content item to the display device for display.

8. The wireless communication device of claim 1, wherein the reply comprises the media content item.

9. The wireless communication device of claim 8, wherein the reply comprises the media content item based on the media content item corresponding to a music video, instructions on how to perform a task, particular media content with a play time less than a threshold, or combinations thereof.

10. The wireless communication device of claim 1, wherein the operations further comprise, in response to the reply comprising a listing of media content:
sending selectable options to the display device, the selectable options including first selectable options corresponding to items in the listing;
receiving second user input that selects a particular selectable option corresponding to a first media content item;
sending a media request for the first media content item to a content source; and
sending the first media content item received in response to the media request to the display device for display.

11. A method comprising:
determining, by a mobile communication device comprising a processor, whether a summary of a media content item is to be obtained, the media content item having been requested for play by first user input, the determining being based upon a type of network connection utilized by the mobile communication device, the determining resulting in a determination;
in response to the first user input and in a case of the determination being that the summary of the media content item is to be obtained, sending, by the mobile communication device to a network device, a request for the summary of the media content item in lieu of sending a particular request for the media content item; and
in response to a reply to the request comprising a listing of media content, sending, by the mobile communication device, selectable options to a display device, the selectable options comprising first selectable options corresponding to items in the listing.

12. The method of claim 11, further comprising:
receiving, by the mobile communication device, second user input that selects a particular selectable option corresponding to a first media content item; and sending, by the mobile communication device, a media request for the first media content item to a content source.

13. The method of claim 12, further comprising:
sending, by the mobile communication device, the first media content item received in response to the media request to the display device for display.

14. The method of claim 13, wherein a first particular selectable option of the selectable options corresponds to the media content item.

15. The method of claim 11, further comprising, in response to the reply comprising media content, sending, by the mobile communication device, the media content to the display device for display.

16. A computer-readable storage device storing instructions executable by a processor of a mobile communication device to perform operations, the operations comprising:
determining whether a summary of a media content item is to be obtained, the media content item having been requested for play by first user input, the determining being based upon a type of network connection utilized by the mobile communication device, the determining resulting in a determination;
in response to the first user input and in a case of the determination being that the summary of the media content item is to be obtained, causing a network interface to send a request for the summary of the media content item to a network device in lieu of sending a particular request for the media content item; and
in response to a reply to the request comprising media content, causing the media content to be sent to an output device.

17. The computer-readable storage device of claim 16, wherein the output device comprises a display device, an audio device, or both.

18. The computer-readable storage device of claim 16, wherein the operations further comprise, after sending the media content to the output device and in response to the reply comprising a subset of frames of the media content item, sending from the mobile communication device to the output device an option to retrieve the media content item.

19. The computer-readable storage device of claim 16, wherein the media content comprises a particular number of frame blocks of the media content item.

20. The computer-readable storage device of claim 19, wherein the frame blocks are uniformly distributed in time in the media content item.

* * * * *